Nov. 2, 1971   R. S. DE GROOTE   3,616,617
LIQUID SEPARATOR
Filed Jan. 13, 1969
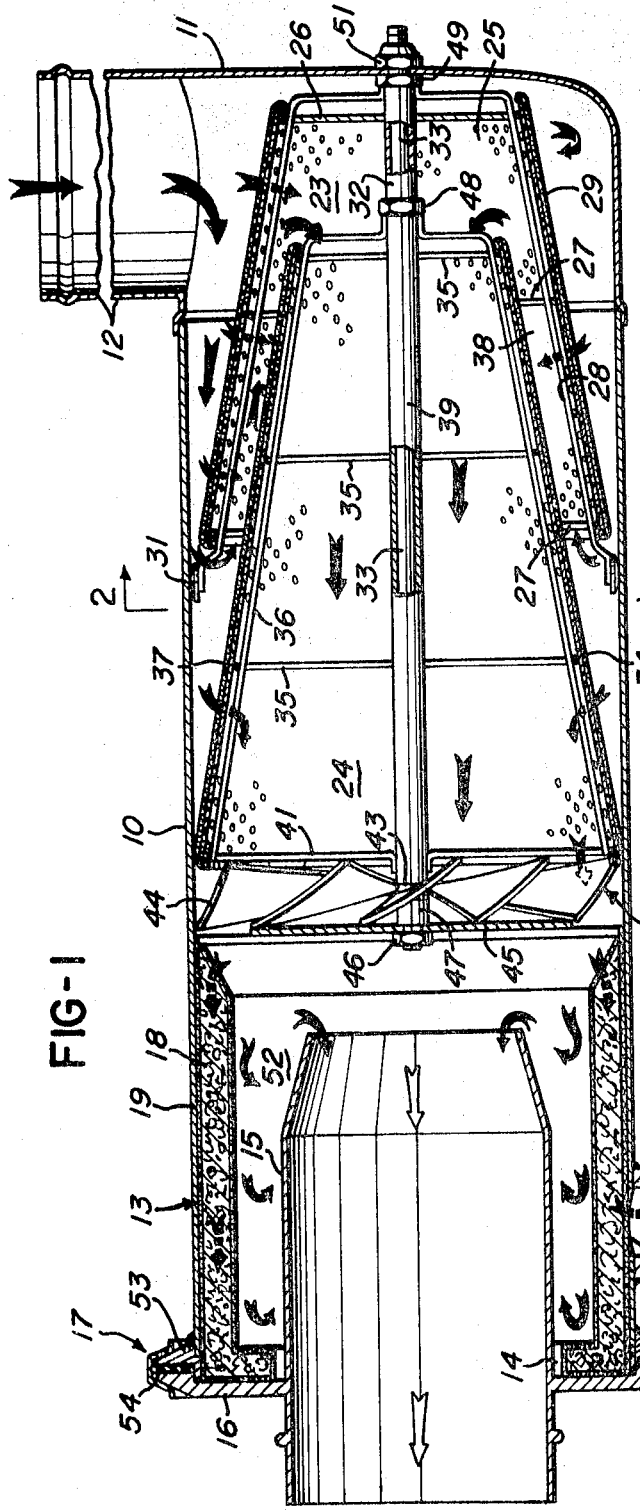
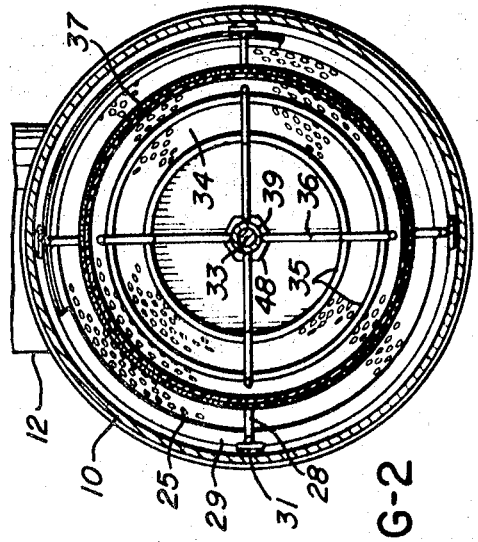
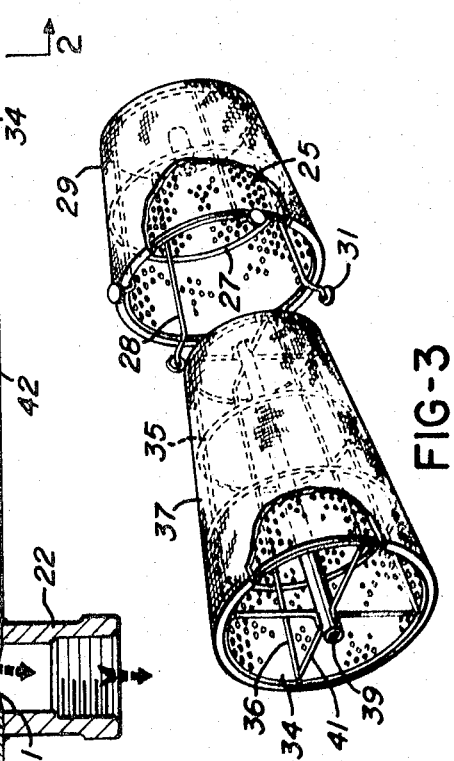
INVENTOR
RAYMOND S. DEGROOTE
BY *J.E. Beringer*
HIS ATTORNEY United States Patent Office 3,616,617
Patented Nov. 2, 1971

3,616,617
LIQUID SEPARATOR
Raymond S. De Groote, Centerville, Ohio, assignor to
United Aircraft Products, Inc., Dayton, Ohio
Filed Jan. 13, 1969, Ser. No. 790,697
Int. Cl. B01d 50/00
U.S. Cl. 55—307    12 Claims

ABSTRACT OF THE DISCLOSURE

A liquid separator in which nested, frusto-conical coalescer elements provide a large surface area for contact with a moisture holding flowing air, the elements between them defining a continuously open, relatively restricted fluid by-pass. Downstream of the coalescer elements means collects and drains formed liquid droplets while the dried air discharges separately.

---

This invention relates to liquid separators operable to remove a liquid, such as water, from a flowing gaseous fluid, such as air. Although not so limited, the invention has particular utility in aircraft wherein high level efficiency requirements exist and wherein there is need for continuing effective operation irrespective of attitude, temperature conditions and other variables.

Separators of the class described commonly employ coalescer screens and the like which when interposed in the path of flow of the gaseous fluid effectively condenses fine vapor particles and forms relatively larger liquid droplets. These are blown clear of the coalescer means and in a subsequent method step are collected and drained while the dried fluid discharges separately. In many such installations encountered temperature conditions are such that the coalescer screens may ice over thereby blocking fluid flow. It has been known heretofore to incorporate a yield in the mounting of the coalescers screens so that portions thereof may deflect under conditions of high pressure differential indicating an icing condition thereby to open a by-pass. The pressure responsive by-pass concepts, however, add to the complication and cost of a separator unit. Also, the relatively high pressure required to open the by-pass may create a maximum pressure drop across the unit greater than is tolerable in many fluid flowing systems.

The instant invention has in view a liquid separator requiring and utilizing a relatively low pressure difference for its effective operation. The need for pressure deflectable coalescer screens is obviated, the invention providing a continuously open by-pass through which only a minor part of the fluid flow normally passes but which is available for use as a by-pass in the event of icing on the coalescer screen surfaces. The invention makes use of air-foil means to promote rapid and effective separation of agglomerated liquid droplets after passage through the coalescer screens under low pressure drop conditions. A feature of the invention is the relative simplicity of the separator unit according to which the coalescer screens are provided in a frusto-conical assembly and have air-foil fluid turning means at one end thereof, all readily accessible for unitary insertion in and removal from a separator housing.

Other objects and structural details of the invention will appear from the following description when read in connection with the accompanying drawings, wherein:

FIG. 1 is a view in longitudinal section of a liquid separator in accordance with the illustrated embodiment of the invention;

FIG. 2 is a view in cross section, taken substantially along the line 2—2 of FIG. 1; and FIG. 3 is a view in exploded perspective of coalescer screen means used in the illustrated embodiment of the invention.

Referring to the drawings, a liquid separator in its illustrated form includes an elongated cylindrical housing section 10, open at both ends. Mounted on to close one end of the housing is a shell 11 having a laterally opening boss 12 serving as the fluid inlet. At its opposite end, the housing section 10 receives a cup shaped cartridge 13, the base of which extends transversely across the end of the housing and is formed with a central through opening 14. The opening 14 accommodates a tube 15 which projects into the housing 10 axially thereof and extends through and beyond the cartridge 13 exteriorly of the housing to serve as a fluid outlet. The tube 15 has radial flange means 16 thereon extending radially in confining relation to the closed end of cartridge 13. A V-clamp 17 releasably locks flange means 16 to the housing 10.

The cartridge 13 is comprised essentially of an absorbent wicking material 18 given rigidity by being encased in perforate screen material 19. The cartridge 13 overlies a drain opening 21 in the housing wall. An external fitting 22 registers with the drain opening 21. In a manner more particularly to be considered hereinafter, the cartridge 13 absorbs agglomerated liquid droplets released from a flowing air stream. The liquid drains from the unit, by capillary action, through opening 21.

Disposed intermediately of the inlet boss 12 and outlet tube 15 is a coalescer screen assembly comprising screen elements 23 and 24 which by virtue of their location in the unit with respect to the direction of fluid flow may be identified respectively as an upstream element and a downstream element. The upstream element 23 is comprised of a frusto-conical screen member 25 made of wire mesh, perforated metal or the like. The screen member disposes coaxially of the housing 10 and is oriented to have its base end received in the housing while its truncated apex end projects into shell 11. A solid plate 26 closes the truncated apex end of the screen member 25. Within the screen member is a series of longitudinally spaced apart, transversely disposed wire rings 27. In intersecting relation to the wire rings 27 is a circumferential series of wires 28 of longitudinal extent. The wires 27 and 28 may be welded or otherwise secured together and to the screen member 25 to form a relatively rigid screen unit. In overlying, covering relation to the screen unit is a sleeve 29 made of a coalescing material, as for example a synthetic fibrous, felt-like material. The fabric sleeve 29 is readily permeable by flowing air but entrained liquid vapor in such penetrating air tends to be condensed or coalesced and to assume the form of relatively large droplets. The fabric sleeve thus has characteristics of porosity and interposes an arrangement of fibers tending to intercept and form nuclei of individual particles of moisture which gather other particles about them and build into water droplets. Synthetic fabrics of Dacron, nylon and like materials are suitable for the purpose.

The maximum diameter of screen element 23, at the base thereof, is less than the inside diameter of housing 10. Centered within such housing, therefore, the screen is spaced from housing walls. The longitudinally extending wires 28 extend through and beyond the base end of screen member 25 and are formed with radially projecting pads to seat against the interior wall housing and hold the base end of the screen element centered therein. The opposite ends of the wires 28 are bent divergently inward and fixed to the interior of a short length tubular member 32 positioned axially of the screen member. A shaft 33 has one end fixed in the wall of shell 11 and extends longitudinally of the housing 10 in the axis thereof, the shaft mounting tube section 32 thereon and thus supporting the truncated apex end of screen element 23.

The screen element 24 is constructed like the screen element 23 but is longer than the element 23 and has a wider base end, as well as being formed to a greater degree of angularity. It thus comprises a frusto-conical screen member 34 made of wire mesh or the like, transverse rings 35 and circumferentially spaced apart, longitudinally extending wire supports 36. Covering the screen element is a fabric sleeve 37 which is the same as sleeve 29 and serves a like coalescing function. The screen element 24 is oriented like screen element 23 to have its base end facing into the housing 10. Toward the apex end thereof element 24 is telescopically received within the base end of element 23. The screen elements are, however, spaced apart in a longitudinal sense, and, by reason of the differential angularity thereof are transversely spaced apart to define therebetween a passage 38. The apex end of screen element 24 is open and is fixed relatively to the housing and to element 23 by inwardly turned extensions of longitudinal wire supports 36 which fix to one end of a tube 39 on the shaft 33. The base end of screen element 24 has a diameter, when overlaid by fabric sleeve 37, to have a substantial bearing contact with the interior wall of housing 10. The base end of the element accordingly may be considered fixed relatively to the housing although capable of longitudinal sliding motion. Wire struts 41, which may be integral portions of wire supports 36, extend inwardly from the base periphery of the screen element 24 and fix to the opposite end of tube 39. The shaft 33 extends longitudinally through and beyond the tube 39 and so finds what may be considered its outer free end supported by and within the base end of element 24.

Immediately beyond the base end of screen element 24 is a multi bladed airflow guide 42. A hub 43 thereof mounts the guide on shaft 33 to be coaxial with the shaft and screen assembly. From the hub 43 project a circumferential series of blades 44 so formed as to define air-foil sections. The blades have the effect of influencing and guiding the flow of air in a helical path without, however, imposing a material pressure drop. Beyond guide member 42 is a disc or baffle 45 also on shaft 33 and confining air flow through and beyond the guide 42 to a relatively restricted annular area adjacent to the housing wall. The hub 43 could be enlarged approximately to the dimensions of disc 45 whereby to obviate need for the latter. The guide member 42 is stationary in the unit. A nut 46 is fixed to shaft 33 to allow axial clamping pressure to be applied to the disc 45 through a bushing 47 and associated, aligned elements including hub 43 and tube 39. A nut 48 on the shaft 33, at the opposite end of tube 39, provides a reactant means whereby the entire assembly comprising screen element 24, guide 42 and disc 45 may be releasably locked to the shaft 33. In similar manner, a nut 49 cooperates with nut 48 to lock the screen element 23 to shaft 33. A nut 51 is threaded to shaft 33 and secures the projecting shell mounted end of the shaft 33 to the housing.

In the operation of the separator unit, it is installed in a system directing a moisture laden fluid under pressure, for example compressed air containing fine water particles, to the separator by way of inlet boss 12. Entering shell 11 and the communicating end of housing 10, the air distributes itself in a surrounding relation to the screen assembly including both screen elements 23 and 24. The air is free to flow transversely through the fabric sleeves 29 and 37 and through the screen members 25 and 34 overlaid thereby. Reforming within element 24, the flowing air stream encounters air-foil blades 44 and is directed in a helical flow path bringing it into contact with the cartridge 13 installed peripherally of the housing immediately beyond the air flow guide 42.

The outlet tube 15 projects inwardly of cartridge 13 and defines therewith an annular chamber 52. One end of such chamber substantially aligns with the restricted annulus through which fluid escapes past turning device 42. Accordingly, helically moving fluid forms a substantial vortex pattern in the chamber 52 facilitating the yielding up of liquid droplets to the cartridge 13. Flowing to the closed outer end of chamber 52, air in such pattern reverses itself and moves along the wall of tube 15 to the entrance end thereof. Such entrance end may be tapered as shown.

A flange-like fitting 53 is fixed to the end of housing 10 and provides a partial bearing for the cartridge 13. The fitting 53 is formed in complementary manner to the flange 16 on tube 15 and is secured therewith by the V-clamp 17. A seal 54 between the opposing flange structures inhibits an escape of liquid through the defined joint.

The construction and arrangement of parts lends itself to ready assembly and disassembly. Removal of the clamp 17 releases tube 15 and its flange 16 for removal. This exposes cartridge 13 for withdrawal whereupon, after removal of nut 51, the screen and air guide assembly can be withdrawn axially from the housing.

The coalescing screen elements 23 and 24 expose a large surface area to contact with incoming fluid and normally imposes no appreciable restriction to flow therethrough. Under ordinary circumstances, therefore, a major part of the incoming fluid flows transversely through the fabric sleeve coverings 29 and 37 into the screen assembly to discharge as described past the air-foil blades 44. The space 38 defined by the telescoping portions of the screen elements is continuously open, however, and a part of the incoming fluid is permitted to flow over the base end of element 23 into passage 38 and then over the apex end of screen element 24 into such element. Within the screen element 24 the major and minor flows are combined for directing to the collecting and draining means as represented by cartridge 13 and to outlet 15. It will be understood, in this connection, that the separator unit of the invention contemplates operation to a predetermined degree of efficiency. The high degree of efficiency with which screened air has liquid removed therefrom makes tolerable the presence of a limited amount of unscreened air. Moreover, air-foils 44, the vortex of chamber 52 and cartridge 13 have effective separation and removal characteristics independently of the agglomeration produced by the coalescing screens. Hence some of the liquid in the unscreened air is removed even without benefit of passage through the coalescing fabrics.

Passage 38 thus represents a portion of a continuously open by-pass having an open area substantially less than the flow area of said coalescing means, the presence of which is suitably compensated for to allow the desired efficiency level of operation to be reached and maintained. Should the surfaces of the coalescing screens, or portions thereof, become clogged, as by icing, passage 38 represents a means by which flow through the unit may be continued. It may be critical in the operation of a system embodying the separator that air flow be maintained despite a reduction in separating efficiency.

It will be evident that modifications may be made in structural details of the disclosed device, without departing from principles of the invention as expressed in accompanying claims. For example, while the coalescing screens have been disclosed as circular in cross section they might also be square or rectangular, assuming in this case a frusto-pyramidal or like configuration. The housing 10 would then have a corresponding configuration. Further, by making the screens in an irregular, pleated or similar form, the surface area thereof may be increased.

What is claimed is:

1. A separator for removing liquid particles in a flowing gaseous stream, including a housing having a fluid inlet and fluid outlet, coalescing means disposed in said housing between said inlet and outlet, said coalescing means including at least one truncated conical screen covered by a coalescing material said coalescing means arranged in such flow restricting position in the housing as to constrain fluid flowing between said inlet and outlet to flow through said covered screen, liquid particles condensing on said screen and being blown therefrom as liquid droplets, means beyond said coalescing means for collecting and draining said droplets, and means defining a continuously open by-pass through said coalescing means, the open area of which by-pass is substantially less than the flow area presented by said coalescing means, the apex portion of said screen being open to define a portion of said by-pass.

2. A separator according to claim 1, wherein said coalescing means includes a pair of truncated conical screens in a nested relation wherein telescoping portions thereof are spaced apart, said screens comprising upstream and downstream screen elements in regard to the direction of fluid flow, the truncated apex end of the upstream element being closed with the base end being spaced from the housing, by-passing flow occurring around the base end of said upstream element between the telescoping portions of said elements and into the truncated apex end of the downstream element.

3. A separator according to claim 1, wherein said housing includes an elongated intermediate portion, said coalescing means having the form of truncated nested screens disposed coaxially in said intermediate housing portion, a downstream screen having a base end in substantially contacting closing relation to the housing wall and an upstream screen receiving through its base end the truncated end of said downstream screen in aligned radially spaced relation, the base end of said upstream screen being longitudinally spaced from the corresponding end of said downstream screen and having portions radially spaced from the housing wall for a flow of fluid thereby, the truncated end of said upstream screen being closed, and coalescing fabric means individually overlaying said screens, the flowing fluid dividing normally into a major portion passing transversely through said covered screens and a minor portion passing around the base end of said upstream screen between the screens and into the truncated end of said downstream screen, the portions joining interiorly of said downstream screen and flowing longitudinally out the base end thereof.

4. A separator according to claim 1, characterized by air-foil means located in the path of flow of said fluid beyond said coalescing means and in advance of said collecting and draining means imparting a helical turning movement to the flowing fluid, said collecting and draining means being installed peripherally of said housing to extend longitudinally thereof and receive liquid droplets thrown from the helically moving fluid.

5. A separator according to claim 4, characterized in that said collecting and draining means includes a cartridge of absorbent material and an opening in said housing covered by said cartridge.

6. A separator according to claim 1, wherein said coalescing means includes a pair of screen elements closed in cross section and tapering from a relatively large base to a smaller apex end, said apex end being truncated, said screen elements being disposed coaxially of one another in a partly telescoping relation and forming an assembly which at a base end of the downstream element thereof having regard to the direction of fluid flow from said inlet to said outlet substantially seats against the housing wall to inhibit fluid flow thereby and which at the base end of the upstream element is spaced from the housing wall, the upstream end of said assembly being closed and the downstream end open, said screen elements being individually covered by the coalescing material, fluid entering said housing by way of said inlet flowing in major part transversely through the coalescing material on said screen elements and through said screen elements to the interior of said assembly and discharging longitudinally thereof through said downstream end, a truncated end of the downstream screen element being open and being received in the base end of the upstream element and being radially spaced therefrom to define said by-pass, and means for positioning said upstream element with its base end spaced as defined.

7. A separator according to claim 6, characterized in that said screen elements have a cross sectional configuration to conform to the cross sectional configuration of the housing portion in which such elements are received, and occupy respective upstream and downstream locations relative to the direction of fluid flow, the base end of the downstream element defining the downstream end of said assembly and the apex end of the upstream element defining the upstream end of said assembly.

8. A separator according to claim 7, characterized by air-foil means stationarily installed in said housing immediately beyond and axially of the base end of the downstream element to impart a helical turning movement to the discharging fluid, said collector and draining means being installed peripherally of said housing to receive liquid droplets thrown from the helically moving stream, said outlet being disposed in the housing beyond and axially of said air-foil means.

9. Apparatus for separating and removing liquid from a flowing stream of gaseous fluid, including a generally closed cylindrical housing, coalescer screen means of conical configuration longitudinally disposed in said housing with its apex end spaced from the interior housing wall and the base end approaching contact therewith, an inlet opening the interior of the housing to said flowing stream of gaseous fluid adjacent the apex end of said screen means, the fluid distributing itself around said screen means, flowing therethrough to the interior of said screen means and out the base end thereof toward an end of said housing, means in said housing beyond said base end of said screen means for separating out agglomerated liquid from the flowing stream and separately discharging from said housing the separated liquid and the remaining gas, and means defining a continuously open by-pass small in area relative to the area presented by said coalescing screen means whereby the flowing stream may move from said inlet to said separating and discharge means independently of said coalescing screen means irrespective of clogging thereof.

10. A separator for removing liquid particles in a flowing gaseous stream, including a housing having a fluid inlet and a fluid outlet, coalescing means disposed in said housing between said inlet and outlet, said coalescing means including at least one truncated conical screen covered by a coalescing material and arranged in such flow restricting position in the housing as to constrain fluid flowing between said inlet and outlet to flow through said covered screen, liquid particles condensing on said screen and being blown therefrom as liquid droplets, means beyond said coalescing means for collecting and draining said droplets, and means defining a continuously open by-pass through said coalescing means, the open area of which by-pass is substantially less than the flow area presented by said coalescing means, the apex portion of said screen being open to define said by-pass, said housing including an elongated intermediate portion, said coalescing means having the form of truncated nested screens disposed coaxially in said intermediate housing portion, said screens being individually covered by the coalescing material, a downstream screen having a base end in substantially contacting closing relation to the housing wall and an upstream screen receiving through its base end the truncated end of said downstream screen in aligned radially spaced relation, the base end of said upstream screen being longitudinally spaced from the corresponding end of said downstream screen and having portions radially spaced from the housing wall for a flow of fluid thereby, the truncated end of said upstream screen being closed, the flowing fluid dividing normally into a major portion passing transversely through said covered screens and a minor portion passing around the base end of said upstream screen between the screens and into the truncated end of said downstream screen, the portions joining interiorly of said downstream screen and flowing longitudinally out the base end thereof, and a circumferential series of stationary air-foil blades stationed at the base end of said downstream screen to impart a helical turning motion to the flowing fluid discharging therefrom, said collecting and draining means including a cartridge of absorbent material installed peripherally of said housing to receive liquid droplets thrown from the helically moving fluid.

11. A separator for removing liquid particles in a flowing gaseous stream, including a housing having a fluid inlet and fluid outlet, coalescing means disposed in said housing between said inlet and outlet, said coalescing means including at least one truncated conical screen covered by a coalescing material and arranged in such flow restricting position in the housing as to constrain fluid flowing between said inlet and outlet to flow through said covered screen, liquid particles condensing on said screen and being blown therefrom as liquid droplets, means beyond said coalescing means for collecting and draining said droplets, and means defining a continuously open by-pass through said coalescing means, the open area of which by-pass is substantially less than the flow area presented by said coalescing means, the apex portion of said screen being open to define said by-pass, said coalescing means including a pair of screen elements closed in cross section and tapering from a relatively large base end to a smaller apex end, said apex end being truncated, said screen elements being disposed coaxially of one another in a partly telescoping relation and forming an assembly which at a downstream end thereof having regard to the direction of fluid flow from said inlet to said outlet substantially seats against the housing wall to inhibit fluid flow thereby and which toward the other end thereof is spaced from the housing wall, the upstream end of said assembly being closed and the downstream end open, fluid entering said housing by way of said inlet flowing in major part transversely through the coalescing material on said screens and through said screen elements to the interior of said assembly and discharging longitudinally thereof through said downstream end, a truncated end of the downstream screen element being open and being received in the base end of the upstream element and being radially spaced therefrom to define said by-pass, said screen elements having a cross sectional configuration to conform to the cross sectional configuration of the housing portion in which such elements are received, and occupying respective upstream and downstream locations relative to the direction of fluid flow, the base end of the downstream element defining the downstream end of the assembly and the apex end of the upstream element defining the upstream end of said assembly, air-foil means stationarily installed in said housing immediately beyond and axially of the base end of the downstream element to impart a helical turning movement to the discharging fluid, said collector and draining means being installed peripherally of said housing to receive liquid droplets thrown from the helically moving stream, said outlet being disposed in the housing beyond and axially of said air-foil means, and means for restricting flow through said air-foil means to a limited area adjacent the housing wall.

12. A separator for removing liquid particles in a flowing gaseous stream, including a housing having a fluid inlet and fluid outlet, coalescing means disposed in said housing between said inlet and outlet, said coalescing means including at least one truncated conical screen covered by a coalescing material and arranged in such flow restricting position in the housing as to constrain fluid flowing between said inlet and outlet to flow through said covered screen, liquid particles condensing on said screen and being blown therefrom as liquid droplets, means beyond said coalescing means for collecting and draining said droplets, and means defining a continuously open by-pass through said coalescing means, the open area of which by-pass is substantially less than the flow area presented by said coalescing means, the apex portion of said screen being open to define said by-pass, said coalescing means including a pair of screen elements closed in cross section and tapering from a relatively large base end to a smaller apex end, said apex end being truncated, said screen elements being disposed coaxially of one another in a partly telescoping relation and forming an assembly which at a downstream end thereof having regard to the direction of fluid flow from said inlet to said outlet substantially seats against the housing wall to inhibit fluid flow thereby and which toward the other end thereof is spaced from the housing wall, the upstream end of said assembly being closed and the downstream end open, fluid entering said housing by way of said inlet flowing in major part transversely through the coalescing material covering the screens and through the screen elements to the interior of said assembly and discharging longitudinally thereof through said downstream end, a truncated end of the downstream screen element being open and being received in the base end of the upstream element and being radially spaced therefrom to define said by-pass, said screen elements having a cross sectional configuration to conform to the cross sectional configuration of the housing portion in which such elements are received and occupying respective upstream and downstream locations relative to the direction of fluid flow, the base end of the downstream element defining the downstream end of said assembly and the apex end of the upstream element defining the upstream end of said assembly, air-foil means stationarily installed in said housing immediately beyond and axially of the base end of the downstream element to impart a helical turning movement to the discharging fluid, said collector and draining means being installed peripherally of said housing to receive liquid droplets thrown from the helically moving stream, said outlet being disposed in the housing beyond and axially of said air-foil means, and a shaft extending coaxially of said screen elements and secured at one end in said housing, the apex end of the upstream screen element mounting to said shaft toward said one end thereof, the base end of the upstream element having radially projecting pad portions to seat against the housing wall, both the apex and base ends of the downstream screen element mounting to said shaft, the base end of the downstream element having a bearing engagement with the housing wall to support the other end of said shaft, and said air-foil means being mounted to said other end of said shaft.

References Cited

UNITED STATES PATENTS

| | | | |
|---|---|---|---|
| 1,535,819 | 4/1925 | Emmet | 55—269 |
| 3,006,435 | 10/1961 | Alton et al. | 55—463 |
| 3,190,057 | 6/1965 | Sinex | 55—481 |
| 1,323,044 | 1/1920 | Hills | 55—521 |

(Other references on following page)

UNITED STATES PATENTS

| | | | |
|---|---|---|---|
| 1,702,804 | 2/1929 | Winslow | 55—521 |
| 1,756,758 | 4/1930 | Orem | 55—484 |
| 2,661,076 | 12/1953 | Walker | 55—Agg. |
| 2,823,760 | 2/1958 | Andersen | 55—Agg. |
| 2,921,646 | 1/1960 | Poole | 55—Agg. |
| 2,961,064 | 11/1960 | Fisher | 55—97 |
| 3,386,230 | 6/1968 | Riesberg et al. | 55—337 |
| 3,394,533 | 7/1968 | Shengli et al. | 55—337 |
| 3,447,290 | 6/1969 | Flory | 55—337 |

FRANK W. LUTTER, Primary Examiner

B. NOZICK, Assistant Examiner

U.S. Cl. X.R.

55—337, 457, 466, 482, 521, Dig. 25